United States Patent [19]
Bell, Jr. et al.

[11] 3,832,511
[45] Aug. 27, 1974

[54] SHORT CIRCUIT PROTECTION SYSTEM FOR ELECTRICAL DISCHARGE MACHINING APPARATUS

[75] Inventors: Oliver A. Bell, Jr., Mooresville; Randall C. Gilleland, Statesville, both of N.C.

[73] Assignee: Colt Industries Operating Corp., New York, N.Y.

[22] Filed: June 25, 1973

[21] Appl. No.: 373,377

[52] U.S. Cl............................. 219/69 P, 219/69 C
[51] Int. Cl.............................................. B23k 9/16
[58] Field of Search ............... 219/69 C, 69 G, 69 P

[56] References Cited
UNITED STATES PATENTS
3,614,368  10/1971  Lobur................................ 219/69 P Primary Examiner—E. A. Goldberg
Assistant Examiner—Hugh D. Jaeger
Attorney, Agent, or Firm—Hauke, Gifford, Patalidis & Dumont

[57] ABSTRACT

The system is one which responsive to gap short circuit condition allows a predetermined train or series of pulses to be applied to the gap. The pulses are of the normal machining pulse on-off time and frequency. The train of pulses is applied and is then followed by an off-time interval several times the duration of the first train. The system includes a gating and a counter system in which there is included a divide-by-ten stage to provide the predetermined series of pulses responsive to gap short circuit condition. The system further includes a series of gates and inverters which inhibit pulses from being fed during the predetermined relatively long off-time interval.

17 Claims, 4 Drawing Figures

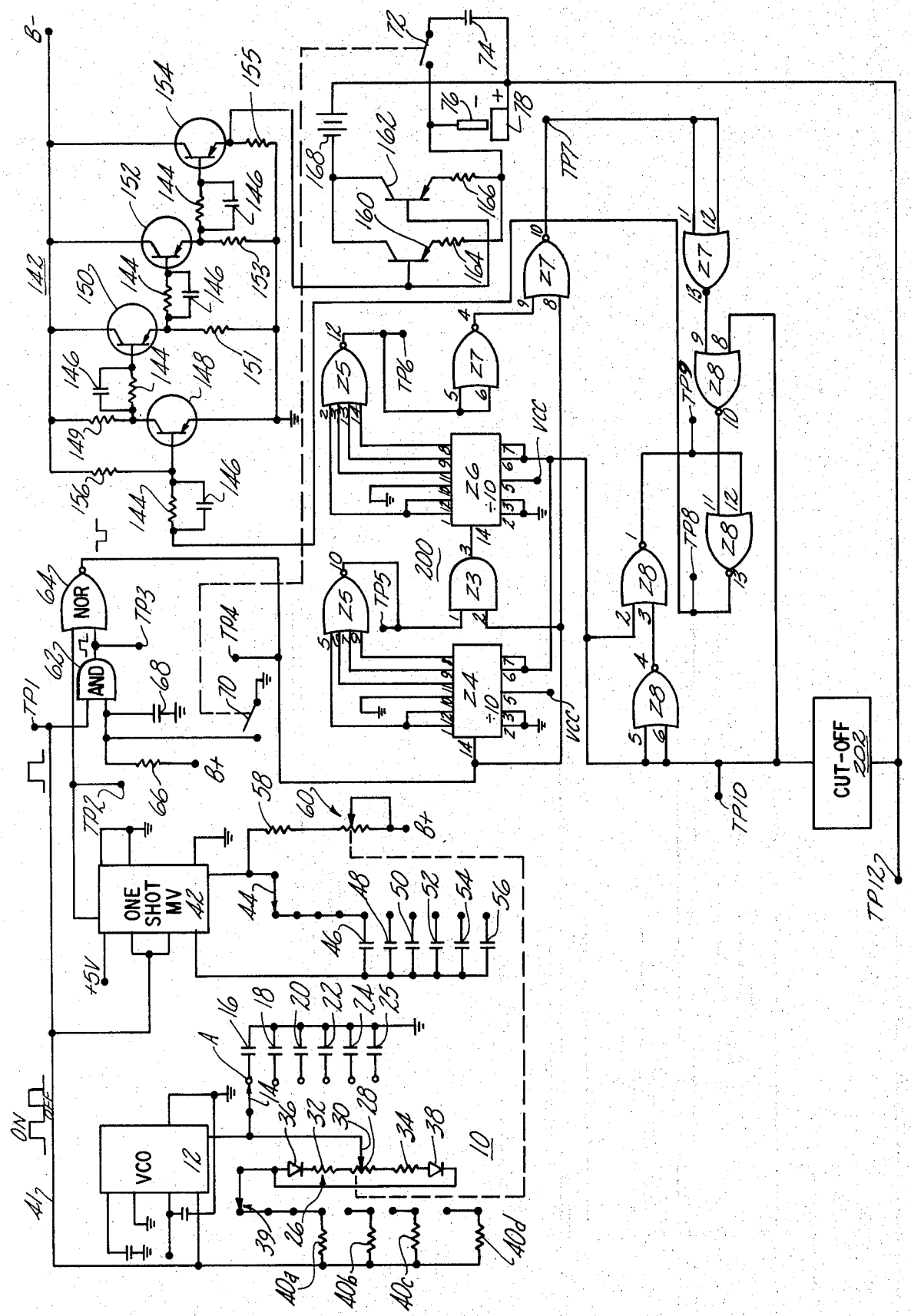

SHORT CIRCUIT PROTECTION SYSTEM FOR ELECTRICAL DISCHARGE MACHINING APPARATUS

RELATED APPLICATION

The present application is related to Bell et al application Ser. No. 343,949, filed on Mar. 22, 1973, for "Pulse Generator and Method for Electrical Discharge Machining," which application is of common ownership and inventorship herewith.

BACKGROUND OF THE INVENTION

The present invention relates to a protection system which becomes operative in an electrical discharge machining apparatus when there has occurred that condition known as "gap short circuit condition," when there is contact between the electrode tool and workpiece, or in some cases a bridging of the gap between tool electrode and workpiece by machined particles or detritus accumulated in the gap. Gap short circuit power interruption systems are known to the prior art in which any of a number of electrical parameters representing the gap short circuit condition, such as gap current or gap voltage, are used as a signal to initiate the interruption of the main electrical discharge machining power supply or, alternately, the interruption of the pulse generator which furnishes the triggering pulses to the electronic output switches used in the EDM power supply.

The present invention is particularly related to those embodiments of electrical discharge machine power supplies in which the pulse generator, drive stage and output switches are transistors and in which the pulse generator is of the independent operating type, such as a multivibrator, oscillator and the like. While transistors are employed as the electronic switching means, the present invention is not limited to use in conjunction with such switching devices. By "electronic switch," we mean any electronic control device having a plurality of electrodes comprising at least two principal or power conducting electrodes acting to control current flow in the power circuit, the conductivity of the power circuit being controlled by a control electrode within the switch whereby the conductivity of the power circuit is regulated statically or electrically without the movement of any mechanical elements within the switch. Included within this definition by way of illustration, but not limitation, are vacuum tubes, transistors, semi-conductor controlled rectifiers, and the like.

Various prior art gap short circuit protection systems have been developed to provide for interruption of machining current responsive to gap condition. One example of such a short circuit protection system is disclosed and claimed in Robert S. Webb U.S. Pat. No. 3,018,411 issued on Jan. 23, 1962, for "Per Pulse Cut-Off Circuit," which patent is of common ownership with the present application. The system that is described in that patent is one in which, responsive to gap short circuit current, there is provided an instantaneous per pulse cut-off operation. The method and apparatus of that patent differ from the present invention with respect to the instantaneous mode of operation in which each pulse is looked at individually and the power content of a defective pulse is literally squelched to provide damaging current flow across the gap during the condition.

An additional example of a gap short circuit protection system is shown and described in Kurt Sennowitz U.S. Pat. No. 3,548,142, issued on Dec. 15, 1970 for "Gap Short Circuit Control System for Electrical Discharge Machining Apparatus," which patent is also of common ownership with the present application. The system disclosed in that patent relates to one in which the drive stage output is actually grounded directly to the gap for the duration of the gap short circuit condition with resulting total power interruption.

A final related gap short circuit protection system is shown and described in V. E. Matulaitis et al U.S. Pat. No. 2,951,969, issued on Sept. 6, 1960, for "EDM Pulsing Circuit," which patent is also of common ownership with the present application. The system disclosed in that patent relates to a system in which the power interruption, unlike most of the remainder of the prior art systems, does include apparatus for continuing separate trains of cutting pulses to the gap for the duration of gap short circuit condition. The circuit disclosed and claimed in that patent includes a "watch dog network" operable in response to decrease in gap impedance for providing actual cut-off of the pulse generator, in that case a multivibrator, and a separate low frequency pulsing network is operably connected to the multivibrator itself causing intermittent operation of it during periods of low gap impedance. In this manner, spaced bursts of relatively high frequency pulses are passed across the gap at relatively low frequency.

It has been found that it is advantageous during the period of gap short circuit to reduce the current being provided to the gap by reducing the number of cutting pulses to approximately 10 percent of the number normally provided. The system, according to the present invention, allows for the necessary reduction of gap current and at the same time provides sufficient pulses to be passed to the gap to keep it alive, and to place it in readiness to resume normal cutting once the shorted condition is alleviated. During the gap short circuit condition, while the spaced series of pulses are being provided, these pulses are continued at normal duty cycle and frequency so that the wear ratio as between tool electrode and workpiece is maintained constant.

BRIEF SUMMARY OF THE INVENTION

The present invention will be seen to incorporate a protection circuit which is associated with the drive stage for the electronic output switches. The protection circuit does not affect the operation of the pulse generator itself and thus eliminates the restart and control problems inherent, particularly with astable multivibrators which are totally cut off in their operation during gap short circuit or have their on-off times altered according to the existence of gap short circuit condition.

The present invention, being operably associated with the intermediate drive stage, has further advantages by including low cost integrated circuit type gating stages and counter stages which count to zero for the predetermined and presettable number of pulses, while not affecting or interfering with the normal continued operation of the pulse generator itself. As soon as the gap short circuit condition is alleviated, the continued passage of normal triggering pulses for the output switches resumes uninterrupted through the drive stage of the EDM power supply.

BRIEF DESCRIPTION OF THE DRAWINGS

The present invention, its operation, features and advantages, and the advancements which it affords will be understood from the following specification, together with the drawings in which like numerals are used to refer to similar or like parts where they occur, and wherein:

FIG. 1 is a combined block diagrammatic and schematic showing of the invention showing the detail of the EDM pulse generator, and the protection system involved;

DETAILED DESCRIPTION OF THE PREFERRED EMBODIMENT

Figure 3A:
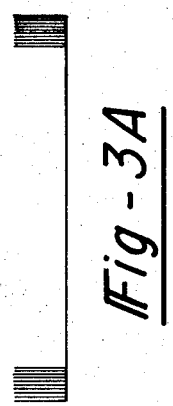
FIG. 3A is a gap voltage waveform further clarifying the operation of the protection system during gap short circuit.

The present invention will be explained with relationship to an electrical discharge machining power supply that has in it two different pulse generators, one operable during normal cutting operation with variable and controllable on-off time ratio or duty factor. The second pulse generator is operated in phase with the first but used to provide pulses of a substantially limited duty factor, particularly during finishing operation which is conducted in the gap capacitor mode. The two different modes of operation and the manner in which the circuits operate are shown and described in our aforementioned U.S. Pat. application Ser. No. 343,949.

The first of the two pulse generators included in the power supply apparatus is indicated generally by the numeral 10 and includes a voltage controlled oscillator 12 which provides at point A a saw-toothed voltage waveform output. A capacitor tap switch 14 is included in the circuit to selectively connect one of a plurality of different value capacitors 16–25 in the circuit. The on-off time control part of the pulse generator 10 includes a rheostat 26 having a variable resistor 28 and a movable contact slider 30. A pair of current limiting resistors 32 and 34 are included in the circuit in series with the resistor 28 and a pair of diodes 36 and 38, respectively. A further tap switch 39 is also included for adding into the circuit a selected one of a plurality of different value resistors 40a–40d. A complete description of the oscillator 12, of the multivibrator 10 and their modes of operation is given in our copending application Ser. No. 341,979, filed on Mar. 16, 1973, for "Pulse Generator for Electrical Discharge Machining Power Supply Circuit," which application is of common ownership herewith. The first pulse generator 10 is typically operable over a wide range of duty factors between 1 and 99 percent.

The second of the two pulse generators comprises a retriggerable one-shot multivibrator 42 which is coupled to the output of the multivibrator 10. It will be understood that the oscillator 12 and the one-shot multivibrator 42 are preferably embodied as integrated circuits currently commercially available. An example of one voltage controlled oscillator suitable for use with the present invention is included in the tone frequency decoder Model SE/SN 567 currently commercially available from the Signetics Co. of 811 East Argues Avenue, Sunnyvale, Calif. One type of a retriggerable monostable multivibrator or one-shot, which is likewise commercially available and suitable for use in connection with the present invention, is Model N74122 available from the aforementioned Signetics Co. In a like manner to the first multivibrator 10, the one-shot multivibrator 42 includes a selectively variable resistor-capacitor network which comprises a tap switch 44 and a plurality of different magnitude capacitors selectively switchable into the circuit to control pulse frequency of the output from the one-shot multivibrator 42. The associated capacitors are identified by the numbers 46, 48, 50, 52, 54 and 56. At the right side of the resistor-capacitor network, there is included a series resistor 58 and a rheostat 60 for presetting the on-off time of operation of the one-shot multivibrator 42.

As described in the aforementioned application U.S. Pat. No. 343,949, it will be understood that the duty factor of the one-shot multivibrator 42 is suitably limited to a value of the order of 30 percent of the maximum on-time available. This is done to insure that during the gap capacitor mode of machining there will be provided an adequate time for triggering of the output switches 160 and 162 and for charge and discharge of the gap capacitor 74 without resultant DC arcing or gap short circuiting.

The next following stages in the circuit are an AND gate 62 and a NOR gate 64. An external resistor-capacitor network is provided for the AND gate 62 which includes a resistor 66 and a capacitor 68. The output from the first multivibrator, that is from pulse generator 10, with the exemplary on and off times indicated, is shown at the upper lead 41 in the drawing. This signal is provided as one input to the AND gate 62. A switch 70 is shown with its movable contact in an open position between the lower of the two inputs to the AND gate 62 and ground potential. A second switch 72 is shown connected intermediate the gap capacitor 74 and the gap. The capacitor 74 is switched across the machining gap between the tool electrode 76 and the workpiece 78 during the above-describe capacitor mode of operation. A dash line is included in the drawing to indicate the ganged operation of the two switches 70 and 72. It will be understood that this conjoint operation between the two switches 70 and 72, which occurs during switching changeover between the regular and the gap capacitor mode of operation, could as readily be achieved by including in the circuit a relay arrangement in which the actuation of one switch initiates the closure and operation of another circuit.

With respect to the NOR gate 64, it will be seen that it receives as its two signal inputs the output from the one-shot multivibrator 42 and the output from the AND gate 62. The description of operation of the two multivibrators 10 and 42 and of the AND gate 62 and the NOR gate 64 will be given in the section entitled "Description of Operation."

An intermediate drive stage is included in the power supply circuit and is indicated generally by the numeral 142. The drive stage 142 includes an input network having a base resistor 144 and a parallel capacitor 146. Four separate amplifier stages are included in the drive stage 142, with the first including a transistor 148 in a common emitter stage, and the next three stages including transistors 150, 152 and 154, all being emitter follower stages. Parallel RC signal networks are also included in the input lead to each of the latter three stages which include a capacitor 146 and a resistor 144 in similar manner to the input network provided for the transistor 148. Three separate emitter resistors 151, 153 and 155 are included in the circuit as shown in the drawing. In the first stage including the transistor 148 and its collector resistor 149, the transistor 148 is biased on by a resistor 156. The signal output from the final emitter follower stage, including the transistor 154, is used to control the operation of a pair of electronic output switches, namely transistors 160 and 162. It can be seen that the output switches 160 and 162 are parallel coupled and further connected in series between a main DC power source 168 and the machining gap which as already indicated includes a tool electrode 76 and a workpiece 78 with the plus-minus polarity as shown. It will be understood that while two output transistors are shown in the circuit in accordance with the current requirement for the power supply, a single transistor or a much greater number of transistors may be coupled to provide the necessary current. In the normal operation of EDM power supply, in response to the turn-on and turn-off of the output transistor switches 160 and 162, machining power pulses will be provided to the gap.

The present invention is primarily concerned with an improved short circuit protection system which is indicated generally by the numeral 200. Included in the system are a pair of divide-by-ten counter stages Z4 and Z6. Also included in the system are a pair of quad input NOR gates Z5, with a further pair of NOR gate stages Z7. A further set of gates Z8 are included in the circuit as shown, while with respect to both the left hand and right hand inverter gate Z8 there is provided a control output from a cut-off stage 202 which is connected to sense gap condition in a manner well known to the EDM art.

It will be seen that the pulse output from the NOR gate 64 is thus used as an input to the gap short circuit protection system 200, while a cut-off signal from the gap is used to further control the operation of the cut-off protection system. In the present embodiment of the invention, the gates Z5 and Z7 are incorporated as NOR gates of the integrated circuit type, using TTL logic and capable of achieving high speed operation at relatively low power dissipation. The divide-by-ten counters Z4 and Z6 are incorporated as high speed decade counters of the TTL type. The operation of the short circuit protection system 200, along with the operation of the other associated elements of the EDM power supply circuit, will be described in the following "Description of Operation" section.

The preferred embodiment is not limited to any particular type of integrated circuitry, such as TTL logic elements or DTL logic elements. Integrated circuits are frequently desirable in the interest of reducing the complexity of circuitry, increasing its reliability and further reducing the power requirements for the control system's circuits.

DESCRIPTION OF OPERATION

The initial operation of the power supply circuit is started by the output from the voltage controlled oscillator 12, which has been preset to one of the capacitors 16–25 through the setting of the switch 14. The voltage $V_A$ is of a saw-tooth waveform and represents the voltage excursions on the particular capacitor switched in by the setting of the switch 14. The on-time is increased by moving the movable contact or slider 30 of the rheostat 26 downwardly. This increases the portion of the resistor 28 which is in circuit in the charge path for the capacitor 16. At the same time, the resistance of the resistor 28 in series with the resistor 32 and in the discharge path for the capacitor 16 is decreased, thus decreasing the off-time. The combined resistance of the resistors 40a, 40b, 40c and 40d, 32 and 34, thus serves to provide a limit to the maximum and minimum on-off time periods available during normal machining operation. By the adjustment of the rheostat 26, it is possible to inversely vary the machining pulse on and off time without changing the frequency already preset by the capacitor tap switch 14.

The pulse output is shown at the upper left hand corner of the drawing on the lead 41 and includes an on-time portion and an off-time portion. This waveform is furnished as an input to the upper input terminal of the AND gate 62. An appropriate reference voltage signal is supplied through the resistor 66 to the lower input terminal of the AND gate 62. This input allows the pulse input at the upper input terminal of the AND gate 62 to pass through as an output. The duty cycle of the pulse at the lower input terminal of the NOR gate 64 is always the same or greater than the duty cycle of the pulse input to its upper input terminal. The NOR gate 64 will always pass the longest pulse and provide it as an output in inverted form.

When the operator switches the power supply over into the gap capacitor operating mode for finishing, the switch 72 is closed to connect the gap capacitor 74 across the machining gap. It will be understood that there is normally a bank of capacitors provided so that a choice of different magnitude capacitors is available, for example, through an appropriate tap switch arrangement. As has already been indicated, there is a cooperative relationship between the phasing of the switches 70 and 72. As soon as the gap capacitor selecting switch 72 is closed, the switch 70 is likewise closed, thus grounding the lower input terminal of the AND gate 62 and causing the lower input terminal of the NOR gate 64 to stay at zero. In this condition, the pulse provided at the upper input terminal of the NOR gate 64 is allowed to pass through and to be inverted. Thus, during capacitor mode cutting, there is provided a maximum duty factor triggering pulse of the order of 30 percent, which is placed into effect for controlling the maximum conduction period of the output switches, transistors 160 and 162.

Consideration will now be given to the operation of the circuit in the several different conditions possible, namely, normal cutting as has been described above, open arc condition prior to initiation of gap discharges such as occurs, for example, on initial down-feed or after back-up of the electrode, and finally, short circuit condition of the gap in which there has been either contact between tool electrode 76 and workpiece 78, or a bridging of the gap between these two elements so as to provide excessive and potentially damaging gap current flow.

Figure 2:
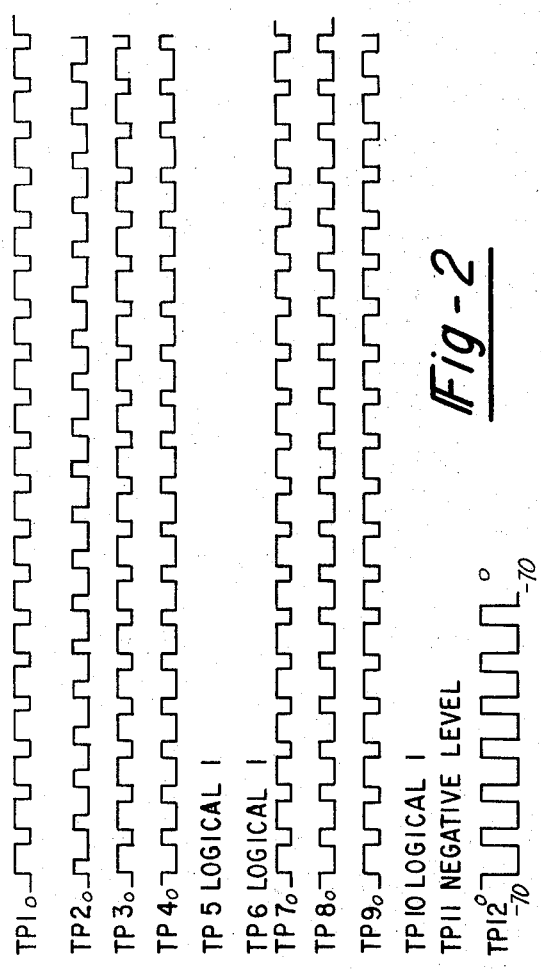
FIG. 2 is a voltage waveform diagram illustrating the operation of the pulse generator, the protection circuit, and the drive stage during the open arc condition.

With reference to FIG. 2, the operation of the circuit in open arc condition is explained with relationship to the voltage waveform as it occurs at the several designated test points TP1-TP12. The zero level is the base line on the several different voltage waveforms shown. The uppermost level of the pulses is typically at 5 volts. Test point 12 illustrates the excursions from zero voltage to minus 70 voltage level, this representing the operation for an EDM power supply in which the DC power supply 168 is of the 70 volt level. The pulse generator 10, assuming the power supply is in the normal cutting condition, thus will continue to operate as a free-running multivibrator during the gap open circuit condition.

During normal cutting, each of the pulses indicated at TP1 will be passed through the drive stage 142 and with normal operation will initiate a gap breakdown with resultant material removal.

Figure 3:
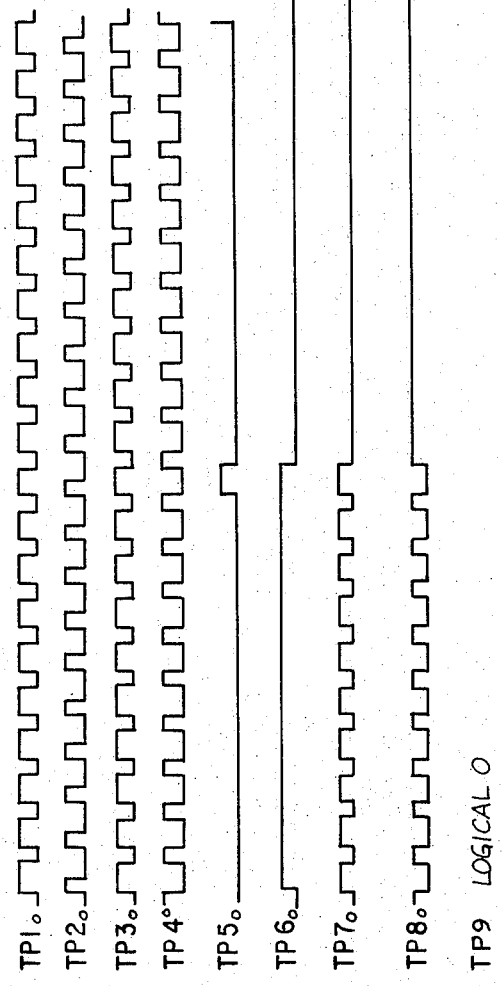
FIG. 3 is likewise a gap voltage waveform diagram but illustrating the operation of the protection system during the gap short circuit condition.

FIGS. 3 and 3A illustrate the operation of the system during gap short circuit condition. FIG. 3A is drawn to a reduced time scale to show the series of 10 pulses followed by the interval of 90 pulses. The pulses from the multivibrator 10 enter the cut-off gating system at test point TP4. These pulses are applied to input lead or pin 14 of the divide-by-ten counter Z4, to pin 2 of gate Z3, to pin 8 of gate Z7, and to pin 2 of gate Z8. It will be understood that during normal cutting operation, pins 6 and 7 of counters Z4 and Z6 are held at a logical 1. This resets the binary coded decimal output and the counter stage pins 1, 12, 11, 9 and 8 all to a logical zero level. The same logical 1 level that is at pins 6 and 7 of the counters Z4 and Z6 is then applied to pins 5 and 6 and 8 and 9 of gate Z8. The logical 1 at pins 5 and 6 of gate Z8 is inverted on its pin 4 and becomes a zero. This zero is fed to pin 3 of the following gate Z8. The zero which is provided as an input at pin 3 of gate Z8 allows the pulses on its pin 2 to pass through and to become inverted. The one provided on pin 8 of the gate Z8 causes the output on the pin 10 to be a zero. At this point, pins 10 and 11 of gate Z8 both have zero level. The zero on the pin 11 of the gate Z8 allows the pulses on pin 12, which come from pin 1 of gate Z8 prior stage, to pass through and be inverted. The output on pin 13 of the gate Z8 is then passed as an input to the drive stage 142 at its left hand end and at the input network, including the resistor 144 and the capacitor 146.

When gap short circuit condition occurs, there will be provided an output of zero level from the cut-off circuit 202 which will be applied to pins 5, 6 and 8 of the gate Z8. The same zero level is applied to pins 6 and 7 of the counters Z4 and Z6. This zero level input allows the counters, connected as divide-by-ten stages, to start counting. This will provide a binary coded decimal output of the pulse count applied to their pin 14, that is the normal pulses from the pulse generator 10. The four binary coded decimal output leads of the counter Z4 are tied to the four inputs to the gate Z5, which is a quad input NOR gate. When all four inputs to the gate Z5 are at zero level, the output at its pin 10 will be a one. The only time when all the binary coded decimal outputs of counter Z4 are at zero level is when the counter reaches the decimal number ten or the decimal number zero. These outputs will stay at a zero level for a period of one input on-time. Otherwise stated, the output on the pin 10 of NOR gate Z5 will be a one only for every 10 ones applied to the pin 1 of the gate Z3. This allows one pulse out of every ten to go through the gate. This pulse appearing at the pin 3 of the gate Z3 is fed as an input to the counter Z6. The counter Z6 is wired in the same manner as counter Z4. Thus, for every ten pulses applied to the input of the counter Z6, one pulse will appear at the output of Z5 on its output pin 12. As the counter Z6 reaches a count of 10, the pin 12 of the gate Z5 will become a one. This one is then applied to the pins 5 and 6 of gate Z7. It then becomes inverted and occurs as an output from the pin 4 of gate Z7 as a zero. This zero signal is applied to the pin 9 of gate Z7, allowing pulses arriving at pin 8 to be inverted and to occur as an output on pin 8. During this period of time, 10 pulses will be gated through the pin 8 of gate Z7. The pulses flowing out of pin 10 at gate Z7 will enter pins 11 and 12 of the next following gate Z7, at which they will become inverted and occur as an output on pin 13 of gate Z7 for pin 9 of the gate Z8. The same zero on pins 6 and 7 of the counter Z4 and the counter Z6 is applied as an input to pins 5, 6 and 8 of the gate Z8. The zero signals on pins 5 and 6 are inverted and come out on pin 4 as a one. This one is applied to the pin 3 of gate Z8 and inhibits any pulses from coming out from pin 1. Pin 1 becomes a zero and is fed as an input to pin 12. This permits whatever is stored in pin 11 to flow through and be inverted. The zero that is now on pin 8 of gate Z8 allows whatever is on pin 9 to flow through and be inverted and to pass on as a signal to the drive stage 142.

The importance of the short circuit protection system according to the present invention will thus be seen in its providing a new and improved counter and gating system which permits a predetermined train of pulses to pass through the gap at the same duty cycle and frequency during the gap short circuit condition. Each train of 10 pulses is then followed by 90 off-time pulses and the manner in which this occurs is best shown in FIG. 3A. It will be understood that the exemplary embodiment of the invention shows 10 pulses on, 90 pulses off, and then repeats the cycle. This particular ratio is not a limiting one with respect to the present invention, but may be varied in accordance with the type of counter used in counters Z4 and Z6 and the proportion of triggering pulses desired.

The advancement provided by the present invention is more particularly related to providing a train of pulses of regular machining pulse on-off time, then interrupting pulses a substantially longer interval than the time for the pulse train, and then repeating the cycle. In this manner, during the partial period when machining is continued, maintaining the same pulse on-off time ratio the same contributes to uniformity of results in the overall cutting operation.

What is claimed is:

1. In an electrical discharge machining power supply having an electronic output switch operatively connected to a DC source and the gap for providing machining power pulses thereto, a gap short circuit protection system including means operably associated with the gap for providing an output signal responsive to gap short circuit; a gating means responsive to said signal for passing a train of pulses during gap short circuit condition, said pulses of said train of the same duty cycle and frequency as the normal machining power pulses supplied to the gap, said gating means operable to interrupt machining power pulses between each consecutive pulse train for a relatively long interval for the continued duration of the gap short circuit condition.

2. The combination as set forth in claim 1 wherein said gating means has operably connected with it a counter means for predetermining the number of pulses to be interrupted.

3. The combination as set forth in claim 2 wherein said counter means comprises a decade counter connected in a divide-by-ten configuration.

4. The combination as set forth in claim 1 wherein said gating means is connected intermediate the output of a free-running pulse generator and the control electrode for said electronic output switch.

5. The combination as set forth in claim 4 wherein a further gating means is operatively connected to the output from said pulse generator for providing switchover between normal cutting operation and gap capacitor cutting operation with restricted machining power pulse on-time.

6. The combination as set forth in claim 4 wherein said pulse generator includes a voltage controlled oscillator and a one-shot multivibrator stage operably connected to it.

7. The combination as set forth in claim 1 wherein said gating means includes a pair of NOR gates connected in successive stages with an associated decade counter to allow one pulse from every 10 generated to pass through the gating means.

8. The combination as set forth in claim 4 wherein the system includes a final gating stage having its output connected to a drive stage, said drive stage operatively connected to the electronic output switch, said final gating stage having a first input comprising all pulses provided from the pulse generator and a second input which is an inhibit input effective to allow the passage of a train of pulses of said same duty cycle and frequency as the machining power pulses normally provided to the gap but with the predetermined interval between each successive train of pulses.

9. In an electrical discharge machining power supply having a free-running pulse generator and an electronic output switch coupled to the output of said pulse generator and connected to the gap for providing machining power pulses of preset frequency and on-off time thereto, a gap short circuit protection system comprising a plurality of gates coupled in cascade intermediate the output of said pulse generator and the control electrode of said electronic output switch; and a divide-by-ten stage operatively associated with said gating means for allowing the passage of a predetermined proportion of pulses of like frequency and on-off time to said machining power pulses through said gating means.

10. The combination as set forth in claim 9 wherein said gates are connected intermediate the output of said free-running pulse generator and an intermediate drive stage, said drive stage having its output connected to the control electrode of said electronic output switch.

11. The combination as set forth in claim 9 wherein said free-running pulse generator includes a voltage controlled oscillator and an adjustable RC network for providing precisely controllable on-off time and frequency pulses.

12. The combination as set forth in claim 11 wherein there is connected between the output of said pulse generator and said short circuit protection circuit gating means a further gating means for selectively limiting the on-time of pulses during connection of a gap capacitor across the gap for capacitor mode finishing operation.

13. In an electrical discharge machining power supply having a free-running pulse generator and an electronic output switch coupled to the output of said pulse generator and connected to the gap for providing machining power pulses of preset frequency and on-off time thereto, a gap short circuit protection system comprising a divider stage coupled intermediate the output of said pulse generator and the control electrode of said electronic output switch for presetting the proportion of machining power pulses to be provided to the gap; and gating means operably connected between said divider stage and the control electrode of said electronic output switch for passing spaced trains of triggering pulses to said electronic output switch of the proportion preset by the divider stage.

14. The combination as set forth in claim 13 wherein said divider stage comprises a decade counter connected in a divide-by-ten configuration for passing one tenth of pulses provided by the pulse generator.

15. In an electrical discharge machining power supply having a free-running pulse generator and an electronic output switch operatively connected to a DC source and the gap for providing machining power pulses thereto, a gap short circuit protection system including means operably associated with the gap for providing an output signal responsive to gap short circuit; a gating means responsive to said signal for passing a train of pulses during gap short circuit condition, said pulses of said train of the same duty cycle and frequency as normal machining power pulses supplied to the gap, said gating means operable to interrupt machining power pulses between each consecutive train for relatively long intervals throughout the continued duration of the gap short circuit condition; and divider means operatively connected to said gating means for predetermining the proportion of the total number of said pulses to be passed to the gap during said gap short circuit condition.

16. The combination as set forth in claim 15 wherein said divider means comprises a decade counter connected in a divide-by-ten configuration to pass ten percent of the normal machining power pulses.

17. The combination as set forth in claim 15 wherein an intermediate drive stage is coupled between the pulse generator and the control electrode of said output switch, said divider means and said gating means connected in cascade between the output of said pulse generator and the input terminal of said drive stage.

* * * * *